United States Patent [19]

Hoheisel et al.

[11] 4,042,565
[45] Aug. 16, 1977

[54] STRETCHED TUBULAR FILM OF POLYETHYLENE TEREPHTHALATE

[75] Inventors: Klaus Hoheisel, Wiesbaden; Siegfried Janocha, Wiesbaden-Biebrich, both of Germany

[73] Assignee: Hoechst Aktiengesellschaft, Germany

[21] Appl. No.: 641,912

[22] Filed: Dec. 18, 1975

[30] Foreign Application Priority Data

Dec. 20, 1974   Germany .............................. 2460395

[51] Int. Cl.² ...................... C08G 63/66; C08G 63/16
[52] U.S. Cl. ................................ 260/47 C; 260/75 T; 260/75 R; 428/35
[58] Field of Search ................ 260/75 R, 75 T, 47 C; 428/35, 36

[56] References Cited

U.S. PATENT DOCUMENTS

| 3,547,891 | 12/1970 | Snead et al. | 260/75 T |
| 3,798,116 | 3/1974 | Bassett et al. | 428/36 X |
| 3,963,844 | 6/1976 | Shimotsuma et al. | 428/36 |

FOREIGN PATENT DOCUMENTS

| 1,185,103 | 7/1959 | France | 260/75 R |

Primary Examiner—Lucille M. Phynes
Attorney, Agent, or Firm—James E. Bryan

[57] ABSTRACT

This invention relates to a stretched, shrinkable, tubular film of polyethylene terephthalate which has a lower initial point of shrinkage, higher shrinking values, and improved weldability, in which part of the ethylene glycol component is replaced by about 0.5 to 10 mole per cent of bis-phenol-A-bis-(2-hydroxyethyl)-ether.

5 Claims, No Drawings

STRETCHED TUBULAR FILM OF POLYETHYLENE TEREPHTHALATE

The present invention relates to a shrinkable, stretched, preferably seamless tubular film of a polyethylene terephthalate in which part of the ethylene glycol component is replaced by bisphenol-A-bis-(2-hydroxyethyl)-ether, the tubular film being distinguished from conventional tubular polyethylene terephthalate films in that it has a lower initial point of shrinkage, higher shrinkage values, and better weldability. Further, the present invention relates to the use of such tubular films for the production of welded bags with seams of increased strength.

The manufacture of shrinkable polyethylene terephthalate films has long been part of the prior art. In known tube stretching processes, the films extruded from the annular nozzle are stretched in the longitudinal direction and, at the same time, multiaxially over their periphery, normally by inflating them with a gas.

Films prepared in this manner may be used as packaging films in many fields of application.

For many purposes, for example when a shrinking tunnel is used, it is quite sufficient if the film shrinks by about 15% at 90° C and shrinkage begins at about 75° C. If, however, shrink packages are to be produced with the aid of heated liquids, for example, difficulties are encountered because the temperature must be adjusted to relatively high values. If poultry, venison in portions, and the like are to be shrinkpackaged, the degree of shrinkage attainable is frequently not sufficient for the film to closely envelop the packaged goods, so that the package becomes unsightly. Many goods, such as boiled ham and fresh meat, must be shrink-packaged at temperatures as low as possible in order to avoid undesirable damage or discoloration. On the other hand, the shrinking temperatures must not be so low as to risk damage to the film during storage, for example during the summer months.

Further, it is desirable for the polyester films to have good welding properties so that the seams of the resulting bags are of adequate strength and the packaged goods are not damaged during the shrinking process or during storage.

French Patent No. 1,185,103, discloses polyethylene terephthalate copolyesters in which part of the ethylene glycol component is replaced by 10 to 70 mole percent of bisphenol-A-bis-(2-hydroxyethyl)-ether. This latter compound is also designated in the literature as bisphenol-A-diglycol ether and will be referred to in the following as "BDE". The copolyesters described in the French patent are produced for the purpose of improving the properties of polyethylene terephthalate, for example its toughness, impact resistance, abrasion behavior, solubility, and electrical characteristics.

It is mentioned in the French patent that filaments or films produced from the new copolyesters may be oriented by cold drawing.

The French patent contains no reference, however, to shrinkable tubular films with particular characteristics as regards shrinkage, initial point of shrinkage, and weldability of the films produced by stretching at elevated stretching temperatures.

It is the object of the present invention to provide a stretched, shrinkable tubular film which is distinguished from a conventional polyethylene terephthalate film by a lower initial point of shrinkage, higher shrinking values, and improved weldability.

This object is achieved by a stretched, shrinkable, preferably seamless tubular film of polyethylene terephthalate in which part of the ethylene glycol component is replaced by 0.5 to 10 mole percent of bisphenol-A-bis-(2-hydroxyethyl)-ether.

The film according to the present invention has an initial point of shrinkage which is lower than that of conventional polyethylene terephthalate film, preferably below 70° C.

The preferred proportion of BDE is in the range of from 4 to 8 mole percent. The area stretching ratio is up to 1 : 20, the preferred range being between 1 : 10 and 1 : 16.

Advantageously, the tubular films according to the invention have a shrinkage of more than 5 percent, preferably of more than 10 percent at a temperature of 80° C.

The shrinkable films according to the invention are particularly suitable as packaging materials, especially for goods which are to be gently shrink-packaged, at temperatures as low as possible, such as boiled ham, poultry, fresh meat and the like.

Preferably, however, the tubular films, and especially seamless tubular films, are converted into bags which are also used for packaging purposes, as shrink bags. Preferably, these bags are closed by welding with infrared radiation or by flame or hot-wire welding.

As compared with polyethylene or terephthalate bags, the seams of the bags welded in this manner have improved bursting str ngth values, these values being a measure of the quality of the welded seams.

The film according to the present invention will be illustrated in more detail by reference to the following examples:

EXAMPLE 1

Polyethylene terephthalate was extruded at 285° C from an annular die having a diameter of 30 mm, solidified to a 320μ thick film by means of a water-cooled metal mandrel arranged in the interior of the tube, stretched at 85° C in the longitudinal direction by means of pairs of draw rolls running at a higher speed, and simultaneously stretched multiaxially, over its circumference, by inflation with air blown into the interior of the tube at a pressure corresponding to 3,000 mm water column.

The area stretching ratio was 1 : 16.

The tube was cooled to room temperature under tension and then wound up. The resulting tubular film had a thickness of 20μ.

EXAMPLES 2, 3, 4, and 5

The conditions of Example 1 are maintained, except that the polyethylene terephthalate used in Example 1 was replaced by a polyethylene terephthalate in which part of the ethylene glycol component was replaced, respectively, by 2.5, 5.0, 7.0, and 9.0 mole percent of BDE.

The following table shows the values determined for the initial point of shrinkage and for absolute shrinkage. The shrinkage value was determined by immersing a film sample of a size of 10 × 10 cm for 15 seconds in hot water and then determining its shrinkage. Since transverse shrinkage and longitudinal shrinkage were about equal, a mean value was calculated from the two and listed in the table below.

Table I

| Mole per cent of BDE | 0 | 2.5 | 5.0 | 7.0 | 9.0 |
|---|---|---|---|---|---|
| Per cent shrinkage at 80° C | 4 | 10.5 | 15 | 20 | 25 |
| Per cent shrinkage at 90° C | 21 | 23 | 27 | 32 | 35 |
| Initial point of shrinkage (° C) | 78 | 68 | 62 | 59 | 56 |

The materials according to Examples 1 and 3 were converted into 165 mm tubes from which, in turn, bags were produced by infrared or flame welding.

For this purpose, welding apparatuses according to German Offenlegungsschrift No. 2,244,214, or German Offenlegungsschrift No. 2,231,838, were used. The average bursting strength, which was determined by inflating the bags until they burst, is listed in Table 2.

Table 2

| Material of | Example 1 | Example 3 |
|---|---|---|
| Infra-red welding: | | |
| Average bursting pressure (in bars) | 0.27 | 0.50 |
| Deviation from standard (in bars) | 0.10 | 0.01 |
| Flame-welding: | | |
| Average bursting pressure (in bars) | 0.37 | 0.50 |
| Deviation from standard | 0.02 | 0.01 |

The results of the tests show that the films according to the invention possess both the desired lower initial point of shrinkage as also a considerably higher degree of shrinkage.

Additionally, the bags produced from the tubular films according to the invention have improved bursting strength, the bursting strength being used as a measure of the quality of the welded seams, i.e. the weldability of the film. The other desirable qualities of stretched polyethylene terephthalate films, i.e. tear resistance, transparency, etc., were either fully retained by the inventive films or differed only slightly.

It will be obvious to those skilled in the art that many modifications may be made within the scope of the present invention without departing from the spirit thereof, and the invention includes all such modifications.

What is claimed is:

1. An oriented, shrinkable, tubular film of polyethylene terephthalate which has a lower initial point of shrinkage, a shrinkage of more than 5 percent at 80° C, and improved weldability, in which part of the ethylene glycol component is replaced by about 0.5 to 10 mole percent of bis-phenol-A-bis-(2-hydroxyethyl)-ether.

2. A tubular film according to claim 1 in which the ethylene glycol component is replaced by 4 to 8 mole percent of bis-phenol-A-bis-(2-hydroxyethyl)-ether.

3. A tubular film according to claim 1 having an area stretching ratio of up to 1 : 20, especially between 1 : 10 and 1 : 16.

4. A tubular film according to claim 1 having an initial point of shrinkage below 70° C.

5. A welded bag made from a film according to claim 1.